United States Patent
Park et al.

(10) Patent No.: US 7,842,336 B2
(45) Date of Patent: Nov. 30, 2010

(54) METHOD OF FORMING OVERCOAT LAYER, METHOD OF PRODUCING COLOR FILTER SUBSTRATE, AND COLOR FILTER SUBSTRATE AND LIQUID CRYSTAL DISPLAY PRODUCED USING SAME

(75) Inventors: Jin-Won Park, Suwon-si (KR); Ji-Won Sohn, Seoul (KR); Seung-Beom Park, Seoul (KR); Seon-Ah Cho, Busan (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 828 days.

(21) Appl. No.: 11/627,058

(22) Filed: Jan. 25, 2007

(65) Prior Publication Data
US 2008/0090083 A1    Apr. 17, 2008

(30) Foreign Application Priority Data
Oct. 12, 2006    (KR) ...................... 10-2006-0099516

(51) Int. Cl.
B05D 5/06    (2006.01)
(52) U.S. Cl. ..................................... 427/162
(58) Field of Classification Search ............... 427/162
See application file for complete search history.

(56) References Cited

U.S. PATENT DOCUMENTS

| | | | | |
|---|---|---|---|---|
| 5,817,441 | A * | 10/1998 | Iwata et al. | 430/7 |
| 6,582,862 | B1 * | 6/2003 | Nakamura et al. | 430/7 |
| 2005/0142362 | A1 * | 6/2005 | Inaoka et al. | 428/411.1 |
| 2006/0172091 | A1 * | 8/2006 | Tung et al. | 428/1.32 |

* cited by examiner

Primary Examiner—Timothy H Meeks
Assistant Examiner—Elizabeth Burkhart
(74) Attorney, Agent, or Firm—H.C. Park & Associates, PLC

(57) ABSTRACT

The invention relates to a method of forming an overcoat layer, containing a hydrophobic functional group and a hydrophilic functional group, that omits a post-treatment process after the overcoat layer is formed. The invention also relates to a method of producing a color filter substrate, as well as a color filter substrate and a liquid crystal display produced using the same. The method of forming an overcoat layer includes adding an initiator to polymerizable surfactant monomers, coating the polymerizable surfactant monomers, polymerizing the coated polymerizable surfactant monomers, and forming the overcoat layer through a polymerization reaction of the polymerizable surfactant monomers.

15 Claims, 3 Drawing Sheets

METHOD OF FORMING OVERCOAT LAYER, METHOD OF PRODUCING COLOR FILTER SUBSTRATE, AND COLOR FILTER SUBSTRATE AND LIQUID CRYSTAL DISPLAY PRODUCED USING SAME

CROSS REFERENCE TO RELATED APPLICATION

This application claims priority from and the benefit of Korean Patent Application No. 10-2006-0099516, filed on Oct. 12, 2006, which is hereby incorporated by reference for all purposes as if fully set forth herein.

BACKGROUND OF THE INVENTION

1. Field of the Invention

The present invention relates to a method of forming an overcoat layer, containing a hydrophobic functional group and a hydrophilic functional group, that omits a post-treatment process after the overcoat layer is formed. The present invention also relates to a method of producing a color filter substrate and to a color filter substrate and a liquid crystal display produced using the same.

2. Discussion of the Background

Liquid crystal displays (LCD) have been extensively used as flat panel display devices. A liquid crystal display includes a thin film transistor substrate on which pixel electrodes are formed, a color filter substrate on which a common electrode is formed, and a liquid crystal layer that is interposed between the thin film transistor substrate and the color filter substrate. The thin film transistor substrate and the color filter substrate face each other. The liquid crystal display displays an image by applying a voltage to the pixel electrodes and the common electrode to rearrange liquid crystal molecules of the liquid crystal layer so as to control the amount of optical transmittance of the liquid crystal layer.

The liquid crystal displays are divided into an Optically Compensated Birefringence (OCB) mode, a Patterned Vertical Alignment (PVA) mode, an In-Plane Switching (IPS) mode, an Advanced In-Plane Switching (A-IPS) mode and a Fringe Field Switching (FFS) mode, according to driving methods. In the OCB mode and the PVA mode, transparent conductive layers are formed on both the color filter substrate and the thin film transistor substrate. Meanwhile, in the IPS mode, the A-IPS mode, and the FFS mode, a transparent conductive layer is formed on only the thin film transistor substrate.

In a liquid crystal display that is driven in the IPS, A-IPS, FFS mode, or the like, the color filter substrate has black matrixes, color filters, and an overcoat layer. That is, unlike the color filter substrate of the liquid crystal display that is driven in the OCB or PVA mode, a transparent conductive layer that is formed between the overcoat layer and the alignment layer is eliminated.

The black matrix typically separates red, green, and blue color filters. On the color filter substrate, the red, green, and blue color filters are repeatedly formed with black matrixes at the boundaries thereof.

The overcoat layer is formed on the alternately formed color filters and the black matrix, in order to remove step height formed between them. In the IPS, A-IPS, FFS mode, or the like, after the overcoat layer is deposited, an alignment layer is provided on the overcoat layer, and liquid crystals are aligned on the alignment layer in a predetermined direction. Here, the alignment layer needs to be hydrophilic in order to align the liquid crystal molecules in the predetermined direction. At present, examples of a material for the alignment layer include polyimides capable of forming a hydrophilic layer.

In order to remove the step height after the color filters are formed, the overcoat layer needs to be uniformly coated on the color filters. To this end, the overcoat layer needs to have the same hydrophobicity as the color filters and the black matrix. Accordingly, a hydrophobic polymer material is used as a constituent component of the overcoat layer.

However, if the hydrophilic alignment layer is disposed on the hydrophobic overcoat layer, a repulsive force may be generated between the alignment layer and the overcoat layer. Accordingly, the alignment layer may be separated, and therefore, the alignment layer may be unstably formed. In order to remove the repulsive force, it is necessary to make the overcoat layer hydrophilic. Consequently, after the overcoat layer is deposited, the surface of the overcoat layer may be subjected to UV treatment or $O_2$ ashing to make the surface hydrophilic. Thereafter, the alignment layer is formed.

However, the surface post-treatment, such as the UV treatment or $O_2$ ashing, may complicate the process of producing the color filter substrate and reduce productivity. Further, the reduction in productivity may negatively affect the resultant liquid crystal display.

SUMMARY OF THE INVENTION

This invention provides a method of forming an overcoat layer using a polymerizable surfactant. Thus the method does not require a surface treatment, such as a UV treatment or $O_2$ ashing, after forming the overcoat layer.

The present invention also provides a method of producing a color filter substrate, as well as a color filter substrate and a liquid crystal display produced using the same.

Additional features of the invention will be set forth in the description which follows, and in part will be apparent from the description, or may be learned by practice of the invention.

The present invention discloses a method of forming an overcoat layer, including adding an initiator to polymerizable surfactant monomers, coating the polymerizable surfactant monomers forming an overcoat layer through a polymerization reaction of the coated polymerizable surfactant monomers.

The present invention also discloses a method of producing a color filter substrate including forming a color filter and a black matrix and coating polymerizable surfactant monomers, in which an initiator is mixed, on the color filter and the black matrix. An overcoat layer is formed through the polymerization reaction of the polymerizable surfactant monomers and an alignment layer is formed on a surface of the overcoat layer.

The present invention also discloses a color filter substrate including an optical-transmissive substrate, a color filter and a black matrix disposed on the substrate, and an overcoat layer disposed on the color filter and the black matrix. The overcoat layer includes a hydrophobic functional group arranged at interfaces between the overcoat layer and the color filter and the black matrix and a hydrophilic functional group arranged on a rear surface of the overcoat layer. The color filter substrate further includes an alignment layer disposed on the rear surface of the overcoat layer, on which the hydrophilic functional group is arranged.

The present invention also discloses a liquid crystal display including a color filter substrate and a thin film transistor substrate that is bonded to the color filter substrate. The color filter substrate includes an optical-transmissive substrate, a color filter and a black matrix disposed on the substrate, and an overcoat layer disposed on the color filter and the black matrix. The overcoat layer includes a hydrophobic functional group arranged at interfaces between the overcoat layer and the color filter and the black matrix, and a hydrophilic functional group arranged on a rear surface of the overcoat layer. The liquid crystal display further includes an alignment layer disposed on the surface of the overcoat layer, on which the hydrophilic functional group is arranged.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
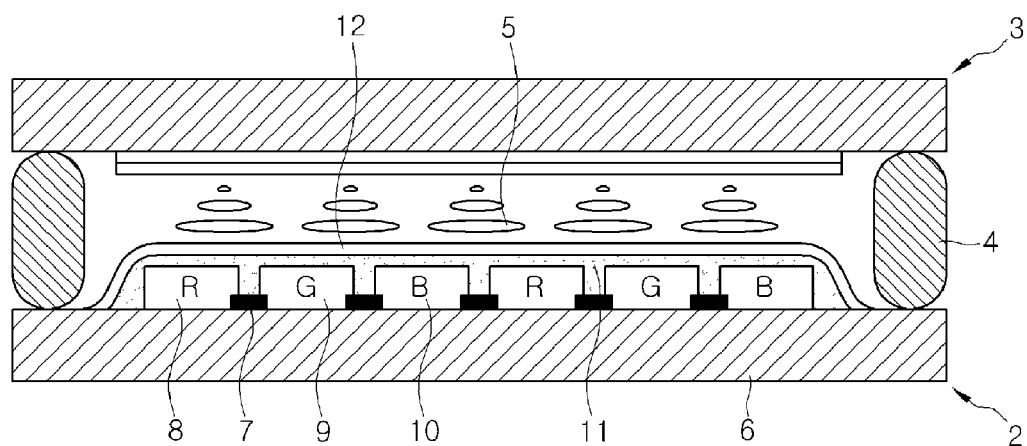
FIG. 1 is a cross-sectional view showing a liquid crystal display according to an exemplary embodiment of the invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

FIG. 1 is a cross-sectional view of a liquid crystal display according to an exemplary embodiment of the invention.

In a liquid crystal display, a color filter substrate 2 is disposed to face a counter substrate 3, on which thin film transistors (TFTs) for driving liquid crystal molecules or transparent electrodes are formed, at a predetermined interval. The color filter substrate 2 and the counter substrate 3 are bonded to each other by a sealing member 4, and liquid crystal molecules 5 are filled into a space defined by the color filter substrate 2 and the counter substrate 3.

Black matrixes 7 are formed at predetermined intervals on the color filter substrate 2. The black matrixes 7 block light incident on a substrate 6, such as glass or the like, separate adjacent color filters 8, 9, and 10, and prevent deterioration of the substrate 6. The black matrixes 7 may be formed by a sputtering process using a nontransparent metal film, such as chromium or the like, or using a resin colored by a dye or a pigment.

A negative photoresist is coated on the color filter substrate 2 on which the black matrixes 7 are formed. The negative photoresist has a spectral characteristic that transmits only light having a red wavelength and absorbs light having other wavelengths. An exposure process is performed using a mask having an opening and then a developing process is performed to form a red (R) color filter 8. The photoresist may be formed of a colored acryl photosensitive resin in which a pigment is dispersed.

A green (G) color filter 9 and a blue (B) color filter 10 are also formed using the above-mentioned process, and thus, the formation of the color filters of the three primary colors, red, green, and blue, is completed.

An overcoat layer 11 is provided on the red, green, and blue color filters 8, 9, and 10 and the black matrixes 7 in order to compensate for step height thereof. Further, an alignment layer 12 for aligning the liquid crystal molecules 5 is formed on the overcoat layer 11.

Figure 2:
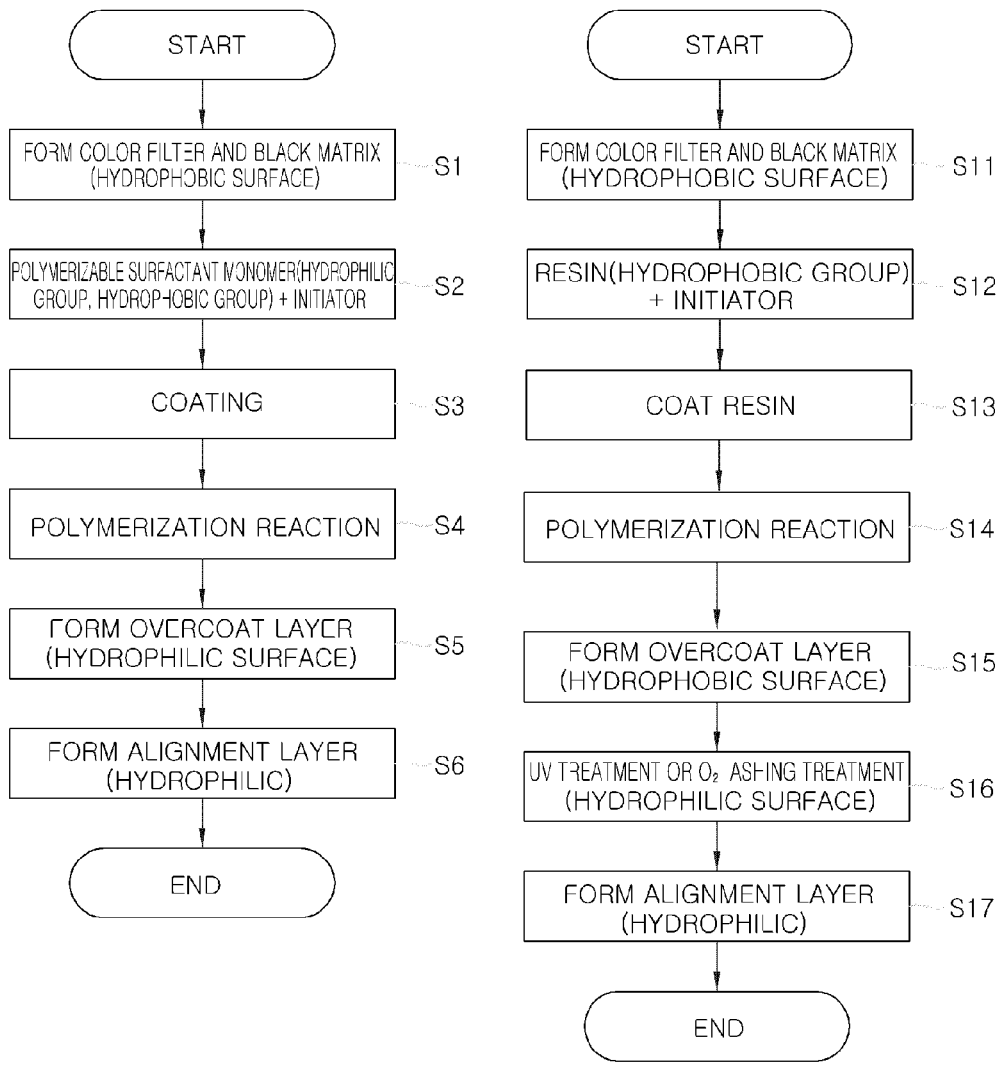
FIG. 2 is a flowchart showing an exemplary embodiment and a comparative example of the invention.

FIG. 2 is a flowchart showing an exemplary embodiment and a comparative example of the invention.

With reference to FIG. 2, a method of forming an overcoat layer according to an exemplary embodiment of the invention includes forming the color filters 8, 9, and 10 and the black matrixes 7 on the color filter substrate 2 (Step S1), adding an initiator to polymerizable surfactant monomers (Step S2), coating the polymerizable surfactant monomers, on the color filters 8, 9, and 10 and the black matrixes 7 (Step S3), polymerizing the polymerizable surfactant monomers (Step S4) to form the overcoat layer 11 (Step S5), and forming the alignment layer 12 on the overcoat layer 11 (Step S6).

Due to the concavo-convex shapes of the color filters and the difference in height between the colors filters 8, 9, and 10 and the black matrixes 7 formed between the color filters 8, 9, and 10, the overcoat layer 11 is formed on the color filter 8, 9, 10 and the black matrix 7 with a predetermined thickness to compensate for the step portions.

In addition, since the overcoat layer 11 may be formed to cover the entire exposed area of the color filters 8, 9, and 10 and the black matrixes 7 and to have a predetermined thickness, the overcoat layer 11 may function to protect the color filters 8, 9, and 10 and the black matrixes 7 from external forces.

Polar molecules and non-polar molecules may be contained in the polymerizable surfactant monomers that are used to form the overcoat layer 11. The polar molecules may be hydrophilic functional groups and the non-polar molecules may be hydrophobic functional groups.

The hydrophobic functional groups do not create a repulsive force and contribute to the adhesion of the overcoat layer 11 to the hydrophobic surfaces of the color filters 8, 9, and 10 and the black matrixes 7.

Examples of the non-polar hydrophobic functional group may include a chain type hydrocarbon group, such as —$C_9H_{19}$ or $(CH_2)_{10}CH_3$, an aromatic hydrocarbon group, an organic silicon group, an alkyl group, and a halogenated alkyl group. Moreover, one or more non-polar functional groups may be contained in the polymerizable surfactant monomer.

In addition, examples of the hydrophilic functional group contained in the polymerizable surfactant monomer may include a hydroxy group, a sulfono group, a carboxy group, an amino group, an ammonium group, —$SO_3$, —$(CH2CH2O)_{10}$, and —COOM (where M is an alkali metal or $NH_4$). Moreover, one or more hydrophilic functional groups may be contained in the polymerizable surfactant monomer.

Examples of the polymerizable surfactant monomer having both the hydrophilic and the hydrophobic functional groups include a material represented by the following Formula or methacryloyloxyethylhexadecyldimethylammonium bromide (hereinafter, referred to as 'DMHB'). In the exemplary embodiment of the invention, the material represented by the following Formula is illustrated.

(Formula)

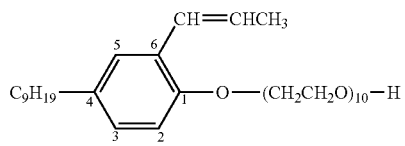

In the material represented by the above Formula, a polar —$(CH_2CH_2O)_{10}$ hydrophilic functional group is disposed at a first site of a benzene ring and a non-polar —$C_9H_{19}$ hydrophobic functional group is disposed at a fourth site of the benzene ring. Further, the hydrophilic and the hydrophobic functional groups are arranged opposite each other around the benzene ring.

In the above Formula, the site numbers of the functional groups of the benzene ring are set merely for explanation of the exemplary embodiment of the invention. With respect to the site number of the functional group, any one functional group around the resonant benzene ring may be set at the first site.

After the polymerizable surfactant monomers, having both the hydrophilic and the hydrophobic functional groups, are prepared, an initiator, such as azobisisobutyronitrile, is added to the polymerizable surfactant monomers.

The azobisisobutyronitrile, when used as the initiator, may be added in an amount of 0.1 to 0.5 wt %. Further, photo-irradiation performed to cause a polymerization reaction.

When azobisisobutyronitrile is added in an amount of less than 0.1 wt %, the amount may not be great enough to initiate the polymerization reaction. When azobisisobutyronitrile is added in an amount of more than 0.5 wt %, voids may be formed in the resultant overcoat layer 11 because of the foaming agent properties possessed by azobisisobutyronitrile. Accordingly, it is preferable that the amount of azobisisobutyronitrile added be 0.1 to 0.5 wt %.

After azobisisobutyronitrile is added in the above-mentioned amount and mixed with the polymerizable surfactant monomers, the resultant mixture is uniformly coated on the color filters 8, 9, and 10 and the black matrixes 7 formed on the color filter substrate 2. Then, the polymerization reaction is performed.

As with this exemplary embodiment, when the photolytic initiator, such as azobisisobutyronitrile, is added, the polymerization reaction may be performed by photo-irradiaton. When other initiators are used, the polymerization reaction may be performed by other corresponding methods.

The polymerization reaction may be an addition polymerization reaction in which —CHCHCH3 groups, disposed at the sixth sites of the benzene rings, are connected to one another to form polymers, thereby forming the overcoat layer 11.

In the overcoat layer 11 formed in such a manner, the hydrophobic functional groups are arranged at interfaces between the overcoat layer 11, and the color filters 8, 9, and 10 and the black matrixes 7 having hydrophobic surfaces. Further, the hydrophilic functional groups are arranged on the surface of the overcoat layer on which the alignment layer 12 is formed.

As represented by the above Formula, since the hydrophilic and the hydrophobic functional groups are arranged opposite each other around the benzene ring, the hydrophobic and the hydrophilic functional groups are arranged at the interface between the overcoat layer 11 and the color filters 8, 9, and 10 and the black matrixes 7 and at the exposed surface of the overcoat layer, respectively.

Next, the hydrophilic alignment layer 12 is formed at the exposed surface of the overcoat layer 11 where the hydrophilic functional groups are arranged.

A brief description will be given for a comparative example.

In the comparative example for the exemplary embodiment of the invention, color filters and black matrixes, having hydrophobic surfaces, are formed on a color filter substrate (Step S11) and a resin to form the overcoat layer and an initiator are mixed (Step S12). Hydrophobic functional groups, corresponding to the hydrophobic functional groups formed on the exposed surfaces of the color filters and the black matrixes, are contained in the resin.

After the resin and initiator mixture is prepared, the mixture is uniformly coated on the exposed surfaces of the color filters and the black matrixes (Step S 13). Next, a desired polymerization reaction is performed (Step S14), according to characteristics of the added initiator and resin to form the overcoat layer (Step S15).

In the overcoat layer, due to the characteristics of the hydrophobic resin, the hydrophobic functional groups are arranged at the interfaces between the overcoat layer and the color filters and the black matrixes. The hydrophobic functional groups are also arranged at the exposed surface of the overcoat layer. When the hydrophilic alignment layer is formed directly on the exposed hydrophobic surface of the overcoat layer, the adhesion properties of the alignment layer may be poor, making it difficult to form the alignment layer. Therefore, it may be necessary to change the hydrophobic surface to a hydrophilic surface. To this end, the exposed hydrophobic surface of the overcoat layer is subjected to a surface treatment process, such as a UV treatment or $O_2$ ashing (Step S16).

With respect to the surface treatment process, when the surface is subjected to the energy-UV treatment, optical energy is used. When the $O_2$ ashing treatment is performed, the affinity of an oxygen ion or an oxygen radical is provided to change the arrangement of atoms at end groups of molecules exposed on the surface. Accordingly, the non-polar surface of the overcoat layer is changed into a polar surface.

To change the non-polar surface into a polar surface, energy that is higher than the inter-atomic bonding energy of the surface molecules is added. For example, kinetic energy of accelerated particles that is higher than the inter-atomic bonding energy of the surface molecules is transferred to dissociate the atomic bonds of the surface molecules. Further, ionized species or activated radicals collide into the molecules that are bonded to the surface. These ionized species and activated radicals have an affinity higher than the inter-atomic affinity of the surface molecules and separate the atoms of the surface molecules, causing deformations in the dipole moment of the molecules at the surface. That is, the sum of vectors of the dipole moments in equilibrium is randomly deflected to be non-equilibrium such that the dipole moments act unidirectionally. Thereby, the surface of the overcoat layer is transformed into a polar surface.

In the specification, the term 'surface' does not mean a single layer that is formed on the surface with respect to a bulk material, but rather, means an area ranging from the single layer on the surface to a sub-surface on which a Coulomb force applies or was applied, due to the dipole moment vectors formed the intra-functional group, the inter-functional groups, the inter-radicals, and/or interaction thereof.

Due to the above-mentioned mechanism, when energy is applied to the surface to remove the atom or break the bond, it may take a long period of time and a high amount of energy to obtain a desired ratio of the hydrophilic area to the total surface area. In particular, as the size of the liquid crystal display including the color filter substrate on which the overcoat layer is formed increases, the time and cost to manufacture the display also increase.

After the above-mentioned surface treatment is performed, if the exposed surface of the overcoat layer has a desired ratio of the hydrophilic area to the total surface area, the hydrophilic alignment layer may be formed on the surface (Step S17). Then subsequent processes, that is, the color filter substrate and the thin film transistor substrate will be bonded each other with liquid crystal such as FIG. 1, are performed.

Figure 3:
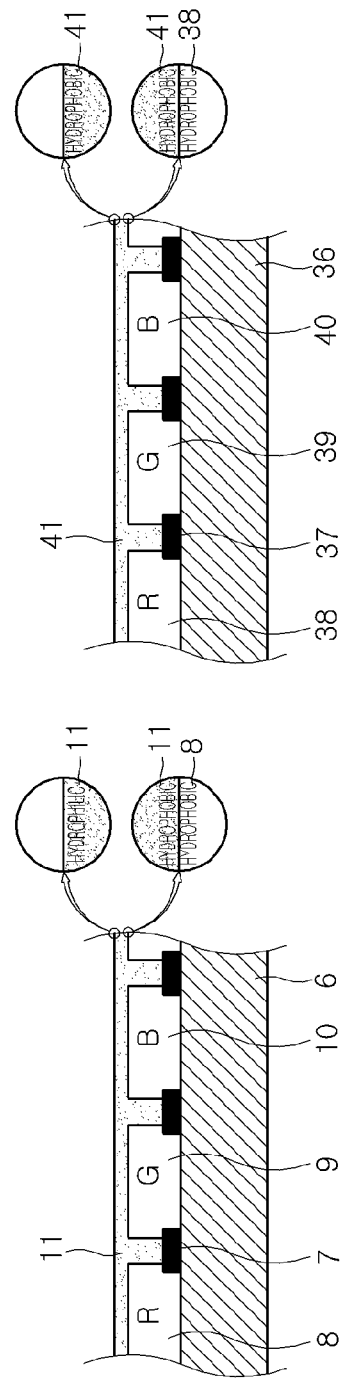
FIG. 3 is a cross-sectional view showing surfaces of overcoat layers of the exemplary embodiment and the comparative example of the invention.
Figure 3:
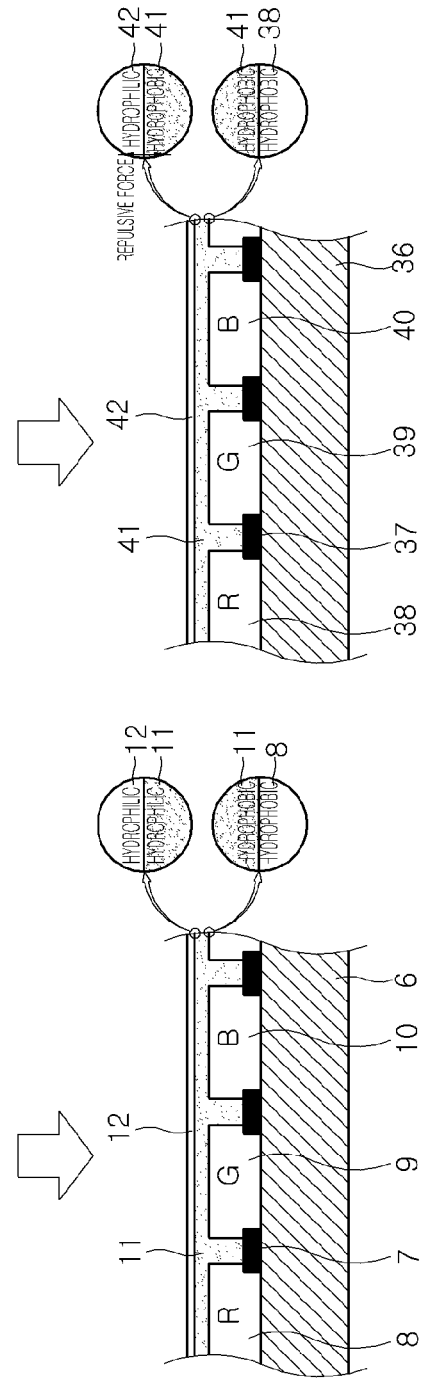

The upper and the lower interfaces of the overcoat layer 11, which is formed by the above-mentioned method, are shown in FIG. 3 in conjunction with those of the comparative example.

FIG. 3 is a cross-sectional view showing the interfaces of the overcoat layers in the exemplary embodiment of the invention and the comparative example.

In the exemplary embodiment of the invention, the overcoat layer 11 is formed on the color filters 8, 9, and 10 and the black matrixes 7 that have the hydrophobic surfaces. In this case, the hydrophobic functional groups are arranged at the interface between the overcoat layer 11 and the color filters 8, 9, and 10 and the black matrixes 7.

If the mean molecular weight of the overcoat layer 11 is less than 10,000, the overcoat layer 11 rarely has the functional groups to be divided into the hydrophilic and the hydrophobic groups. For example, in the case of the monomer that is represented by the above Formula and has a molecular weight of 600 to 800, the number of bonds is undesirable and therefore, the bonding force is poor. If the weight mean molecular weight is more than 100,000, the chain of the functional groups is long, and thus, the viscosity increases. Accordingly, it is difficult to form a uniform layer. As such, the weight mean molecular weight of the overcoat layer 11 may be 10,000 to 100,000.

The hydrophobic functional groups formed on the overcoat layer 11 act to adhere the overcoat layer 11 to the hydrophobic surfaces of the color filters 8, 9, and 10 and the black matrixes 7. Accordingly, it may be possible to form a uniform overcoat layer 11 and to improve the adhesion strength of the overcoat layer 11 to the color filters 8, 9, and 10 and the black matrixes 7.

After forming the overcoat layer 11, the hydrophobic functional groups are arranged at the interface between the overcoat layer 11 and the color filters 8, 9, and 10 and the black matrixes 7, and the hydrophilic functional groups are arranged at the surface that is opposite the interfaces, that is, the exposed surface of the overcoat layer 11.

The hydrophilic functional group is disposed at the first site, which is opposite the hydrophobic functional group at the fourth site. In this case, the hydrophilic and the hydrophobic functional groups are arranged around the benzene ring of the above Formula. Accordingly, the hydrophilic functional group is arranged at the surface on which the alignment layer 12 is formed.

Due to the hydrophilic functional group at the surface of the overcoat layer 11, the hydrophilic alignment layer 12 may be easily formed and stably disposed on the surface of the overcoat layer 11.

In the comparative example of FIG. 3, red, green, and blue color filters 38, 39, and 40 and black matrixes 37 are formed on a substrate 36, and an overcoat layer 41 is formed on the color filters 38, 39, and 40 and the black matrixes 37.

In the comparative example of FIG. 3, in order to perform a comparison with the exemplary embodiment of the invention, the alignment layer 42 is formed directly on the overcoat layer 41. Unlike the former comparative example, a surface treatment, such as a UV treatment or $O_2$ ashing, is not performed.

The overcoat layer 41 is hydrophobic with respect to the surfaces of the color filters 38, 39, and 40 and the black matrixes 37, which are also hydrophobic. Accordingly, the interface between the color filters 38, 39, and 40 and the black matrixes 37 and the overcoat layer 41 has desirable adhesive strength. Therefore, the overcoat layer 41 may be easily formed on the surfaces of the color filters 38, 39, and 40 and the black matrixes 37.

In the overcoat layer 41, hydrophobic functional groups are arranged on the surface opposite the interface between the overcoat layer 41, and the color filters 38, 39, and 40 and the black matrixes 37, that is, the exposed surface of the overcoat layer 41. Since the overcoat layer 41 is formed of a hydrophobic substance, only the hydrophobic functional group is formed on the whole overcoat layer 41, as well as at the exposed surface of the overcoat layer 41. The alignment layer 42 is formed on the exposed hydrophobic surface of the overcoat layer 41.

As shown in the comparative example of FIG. 3, the alignment layer 42 includes a hydrophilic bulk. Accordingly, a hydrophilic-hydrophobic interface is formed between the alignment layer 42 and the overcoat layer 41.

As described above, repulsive forces act between the polar hydrophilic functional group and the non-polar hydrophobic functional group at the interface between the hydrophilic alignment layer 42 and the hydrophobic overcoat layer 41. Accordingly, it may be difficult to form the alignment layer 42 and adhesive strength may be poor even once the alignment layer 42 has been formed.

In order to reduce the repulsive forces between polar and non-polar groups or between the hydrophilic and the hydrophobic groups, as shown in the comparative example of FIG. 2, the hydrophobic surface of the overcoat layer 41 may be changed by a surface treatment, such as a UV treatment or $O_2$ ashing, to a hydrophilic surface. However, even after the surface treatment process has been performed, the hydrophilic functional group may be gradually recured into the hydrophobic functional group because of an interface reaction or a self arrangement resulting from aging after the surface treatment. Further, the entire exposed area may not be hydrophilic. Accordingly, the repulsive force may not be effectively and fundamentally reduced at the interface between the overcoat layer 41 and the alignment layer 42.

In contrast, in the exemplary embodiment of the invention, the polymerizable surfactant used to form the overcoat layer 11 forms its own hydrophilic surface in itself. The hydrophobic surface opposite the hydrophilic surface is provided, specifically, the hydrophobic surface of overcoat layer 11 is provided on the hydrophobic surfaces of the color filters 8, 9, and 10 and the black matrixes 7. Accordingly, the hydrophilic surface of the overcoat layer 11 coincides with the exposed surface thereof, that is, the interface between the overcoat layer 11 and the alignment layer 12. Therefore, the ratio of the hydrophilic surface to total surface area may be higher when compared with the comparative example. In addition, since the hydrophilic surface resulting from the bulk property may prevent the occurrence of aging, the adhesive strength with the alignment layer 12 may be improved.

Further, since the hydrophilic functional group is arranged at the exposed surface of the overcoat layer 11, it may be possible to omit a process, such as a UV treatment or $O_2$ ashing, which would otherwise be performed in order to make the surface of the overcoat layer 11 hydrophilic.

It is preferable that the overcoat layer 11 have desirable transmittance to a visible spectrum and amorphousness so as to transmit color light components of the color filters 8, 9, and 10.

The color filter substrate 2, which includes the overcoat layer 11, is bonded to the counter substrate 3 while liquid crystal molecules 5 are interposed between the color filter substrate 2 and the thin film transistor substrate 3. Both ends of the color filter substrate 2 and the thin film transistor substrate 3 are sealed by the sealing member 4, thereby completing the liquid crystal display (FIG. 1).

With respect to the liquid crystal display produced in the above-mentioned manner, the polymerizable surfactant used during the formation of the overcoat layer 11 of the color filter substrate 2 may allow for a post-treatment process, such as a UV treatment or $O_2$ ashing, to be omitted. Accordingly, it may be possible to more rapidly obtain products and to reduce production costs.

In addition, since the adhesive properties between the color filters 8, 9, and 10 and the black matrixes 7 and the overcoat layer 11 may be improved, the reliability and durability of the color filter substrate 2 and the liquid crystal display may be increased.

As described above, a method of forming an overcoat layer, a method of producing a color filter substrate, and a color filter substrate and a liquid crystal display produced using the same, according to the invention, may be advantageous in that the overcoat layer is formed using a polymerizable surfactant, which may improve the adhesive strength between the upper and lower layers and the overcoat layer.

Further, the adhesive strength between the layers may be improved while a surface treatment process, such as a UV treatment or $O_2$ ashing, is omitted. Accordingly, the reliability and durability of the products may be increased. It also may be possible to reduce the production time of the products to increase yield, reduce production costs, and save materials.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of forming an overcoat layer, the method comprising:
    adding an initiator to polymerizable surfactant monomers;
    coating the polymerizable surfactant monomers, to which the initiator is added; and
    forming an overcoat layer through a polymerization reaction of the coated polymerizable surfactant monomers,
    wherein the overcoat layer comprises a hydrophilic functional group and a hydrophobic functional group such that one of the upper surface and the lower surface of the overcoat layer is hydrophilic, and the other of the upper surface and the lower surface of the overcoat layer is hydrophobic.

2. The method of claim 1, wherein the hydrophilic functional group comprises at least one selected from the group consisting of a hydroxy group, a sulfono group, a carboxy group, an amino group, an ammonium group, $-SO_3$, $-(CH_2CH_2O)_{10}H$, and $-COOM$, where M is an alkali metal or $NH_4$.

3. The method of claim 1, wherein the hydrophobic functional group comprises at least one selected from the group consisting of a chain type hydrocarbon group, an aromatic hydrocarbon group, an organic silicon group, an alkyl group, and a halogenated alkyl group.

4. The method of claim 3, wherein the chain type hydrocarbon group is $-C_9H_{19}$ or $(CH_2)_{10}CH_3$.

5. The method of claim 1, wherein each of the polymerizable surfactant monomers comprises a material represented by the following Formula or methacryloyloxyethylhexadecyldimethylammonium bromide (DMHB):

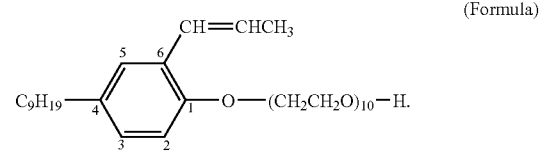

(Formula)

6. The method of claim 1, wherein the polymerizable surfactant monomer comprises the hydrophilic functional group, the hydrophobic functional group, and a polymerizable group such that the hydrophilic group, the hydrophobic group, and the polymerizable group are mutually separated by at least one atom in the polymerizable surfactant monomer.

7. The method of claim 1, wherein the initiator comprises azobisisobutyronitrile.

8. The method of claim 7, wherein azobisisobutyronitrile is added in an amount ranging from 0.1 wt % to 0.5 wt %.

9. The method of claim 1, wherein the polymerization reaction comprises an addition polymerization reaction.

10. The method of claim 1, wherein the overcoat layer comprises a weight mean molecular weight ranging from 10,000 to 100,000.

11. A method of producing a color filter substrate, the method comprising:
    forming a color filter and a black matrix;
    applying polymerizable surfactant monomers, in which an initiator is mixed, on the color filter and the black matrix;
    forming an overcoat layer through a polymerization reaction of the polymerizable surfactant monomers; and
    forming an alignment layer on the overcoat layer,
    wherein the overcoat layer comprises a hydrophilic functional group and a hydrophobic functional group such that one of the upper surface and the lower surface of the overcoat layer is hydrophilic, and the other of the upper surface and the lower surface of the overcoat layer is hydrophobic.

12. The method of claim 11, wherein surfaces of the color filter and the black matrix, on which the polymerizable surfactant monomers are coated, are hydrophobic.

13. The method of claim 12, wherein the hydrophobic functional group is arranged at an interface of the overcoat layer with the color filter and the black matrix.

14. The method of claim 13, wherein the hydrophilic functional group is arranged on the upper surface of the overcoat layer.

15. The method of claim 14, wherein the alignment layer is hydrophilic.

* * * * *